US008846802B2

(12) United States Patent
Bhowmick et al.

(10) Patent No.: US 8,846,802 B2
(45) Date of Patent: Sep. 30, 2014

(54) THERMOPLASTIC ELASTOMER COMPOSITION, METHOD OF MAKING AND ARTICLES THEREOF

(75) Inventors: Anil K. Bhowmick, Kharagpur (IN); Amit Biswas, Mumbai (IN); Samik Gupta, Bangalore (IN); Raja Krishnamurthy, Bangalore (IN); Nisha Preschilla, Bangalore (IN)

(73) Assignee: Sabic Innovative Plastics IP B.V. (NL)

( * ) Notice: Subject to any disclaimer, the term of this patent is extended or adjusted under 35 U.S.C. 154(b) by 1624 days.

(21) Appl. No.: 11/422,380

(22) Filed: Jun. 6, 2006

(65) Prior Publication Data

US 2007/0282052 A1 Dec. 6, 2007

(51) Int. Cl.
*C08G 18/42* (2006.01)
*C08K 5/34* (2006.01)
*C08L 71/12* (2006.01)
*C08L 53/00* (2006.01)
*C08L 71/00* (2006.01)
*C08K 5/00* (2006.01)

(52) U.S. Cl.
CPC ............... *C08L 53/00* (2013.01); *C08L 71/12* (2013.01); *C08L 53/005* (2013.01); *C08L 71/00* (2013.01); *C08K 5/0008* (2013.01)
USPC .......................................................... 524/500

(58) Field of Classification Search
USPC ............. 524/90, 99, 199, 127, 140, 141, 236, 524/250, 416, 436, 437, 500, 504, 505, 508, 524/514, 494; 525/63, 64, 66, 67, 68, 69, 525/70, 88, 92, 98, 99, 132, 133, 192, 242, 525/391, 392, 393, 394, 396, 397, 609, 905, 525/183; 252/500
See application file for complete search history.

(56) References Cited

U.S. PATENT DOCUMENTS

| 4,081,424 | A | * | 3/1978 | Gergen et al. ................. 524/505 |
| 4,299,757 | A | | 11/1981 | Kuribayashi et al. |
| 4,871,810 | A | * | 10/1989 | Saltman ........................ 525/133 |
| 4,985,495 | A | * | 1/1991 | Nishio et al. .................. 525/68 |
| 5,189,103 | A | * | 2/1993 | Abe et al. ...................... 525/133 |
| 5,296,540 | A | * | 3/1994 | Akiyama et al. ............... 525/88 |
| 2002/0151647 | A1 | | 10/2002 | Laughner et al. |
| 2003/0078363 | A1 | * | 4/2003 | Guo et al. ...................... 528/86 |
| 2003/0181584 | A1 | * | 9/2003 | Handlin, Jr. et al. ............ 525/88 |
| 2004/0030014 | A1 | | 2/2004 | Zhang et al. |
| 2004/0127649 | A1 | | 7/2004 | Arjunan et al. |
| 2005/0038203 | A1 | | 2/2005 | Elkovitch et al. |
| 2005/0288402 | A1 | * | 12/2005 | Kosaka et al. .................. 524/90 |
| 2006/0106139 | A1 | | 5/2006 | Kosaka et al. |

FOREIGN PATENT DOCUMENTS

EP 0146172 B1 6/1988
EP 0413972 B1 10/1994

OTHER PUBLICATIONS

International Search Report for International Application No. PCT/US2007/068442, mailed Oct. 2, 2007, 8 pages.
Written Opinion for International Search Report for International Application No. PCT/US2007/068442, mailed Oct. 2, 2007, 8 pages.
ASTM D412-98a "Standard Test Methods for Vulcanized Rubber and Thermoplastic Elastomers-Tension" 14 pages.
Tucker et al. "Thermal, Mechanical, and Morphological Analyses of Poly(2,6-dimethyl-1, 4-phenylene oxide)/Styrene-Butadiene-Styrene Blends" American Chemical Society, Macromolecules, vol. 21, No. 6, Oct. 28, 1987, 1678-1685.
Chiu et al. "Miscibility study on polyphenylene oxide and SBS triblock copolymer blends" European Polymer Journal, vol. 30, Issue 10, Oct. 1994, 1191-1195.
Tucker et al. "Molecular Weigh Effects on Phase Behavior of Blends of Poly(phenylene oxide) with Styrenic Triblock Copolymers" American Chemical Society, Macromolecules, vol. 21, No. 9, Mar. 10, 1988, 2794-2800.
Allen et al. "Degradation and stabilization of styrene-ethylene-butadiene-styrene (SEBS) block copolymer" Polymer Degradation and Stability, 71, Aug. 10, 2000, 113-122.
Sengers et al. "Linear viscoelastic properties of olefinic thermoplastic elastomer blends: melt state properties" Polymer, 45, Oct. 14, 2004, 8881-8891.
Kim et al. "Morphology and rheological behaviour of mixtures of poly(styrene-b-ethylene-co-butylene-styrene) block copolymer and poly (2,6-dimethyl-1, 4-phenylene ether)" Polymer, vol. 34, Issue 22, Feb. 17, 1993, 4613-4624.
European Patent Publication No. 0703279, published Sep. 15, 1995, Abstract Only, 1 page.

* cited by examiner

*Primary Examiner* — Ling Choi
*Assistant Examiner* — Chun-Cheng Wang
(74) *Attorney, Agent, or Firm* — Cantor Colburn LLP

(57) ABSTRACT

A composition comprises a poly(arylene ether); a block copolymer comprising a first block and a second block wherein the first block comprises repeating aryl alkylene units and the second block comprises repeating alkylene units; and an ethylene-vinyl aliphatic acid copolymer wherein the poly(arylene ether) and the block copolymer form a dual phase co-continuous morphology.

40 Claims, 6 Drawing Sheets

GEITC   SEI   20.0kV   X50   100μm   WD 31.5mm

GEITC   SEI   20.0kV   X25   1m   WD 31.1mm

THERMOPLASTIC ELASTOMER COMPOSITION, METHOD OF MAKING AND ARTICLES THEREOF

BACKGROUND OF INVENTION

Disclosed herein are compositions comprising poly(arylene ether) and a hydrogenated block copolymer.

Blends of hydrogenated block copolymers and poly(arylene ether) generally have either the block copolymers or the poly(arylene ether) as a dispersed phase and these blends have utility in a wide variety of applications. Compositions having co-continuous poly(arylene ether) and hydrogenated block copolymer phases offer the potential to have differentiated physical properties from the aforementioned blend; however, such compositions having co-continuous phases generally suffer from unacceptable levels of delamination. These compositions have insufficient physical and mechanical properties for many applications.

Accordingly there is a need for poly(arylene ether)/hydrogenated block copolymer compositions having co-continuous poly(arylene ether) and hydrogenated block copolymer phases that do not suffer from delamination.

BRIEF DESCRIPTION OF THE INVENTION

The foregoing need is addressed by compositions comprising:
a poly(arylene ether);
an optional homopolymer of an alkenyl aromatic monomer;
a block copolymer comprising a first block and a second block wherein the first block comprises repeating aryl alkylene units and the second block comprises repeating alkylene units; and
an ethylene-vinyl aliphatic acid copolymer wherein the poly(arylene ether) and the block copolymer form a dual phase co-continuous morphology.

One embodiment is a composition comprising:
25 to 40 weight percent of a poly(arylene ether) and an optional homopolymer of an alkenyl aromatic monomer;
30 to 70 weight percent of a block copolymer comprising a first block and a second block wherein the first block comprises repeating aryl alkylene units and the second block comprises repeating alkylene units; and
5 to 40 weight percent of an ethylene-vinyl aliphatic acid copolymer wherein the composition has an ultimate elongation greater than or equal to 150% as determined by ASTM D412-98a.

Methods of making the compositions and articles comprising the compositions are also disclosed herein.

BRIEF DESCRIPTION OF THE DRAWINGS

FIGS. 1 and 2 are photographs of samples injection molded prepared according to ASTM D 412-98a.

DETAILED DESCRIPTION

The terms "first," "second," and the like, "primary," "secondary," and the like, as used herein do not denote any order, quantity, or importance, but rather are used to distinguish one element from another. The terms "a" and "an" do not denote a limitation of quantity, but rather denote the presence of at least one of the referenced item. "Optional" or "optionally" means that the subsequently described event or circumstance may or may not occur, and that the description includes instances where the event occurs and instances where it does not. The endpoints of all ranges directed to the same component or property are inclusive of the endpoint and independently combinable.

As used herein, a "dual phase co-continuous morphology" is defined as a morphological structure in which two phases intertwine in such a way that both phases remain substantially continuous throughout the material. The presence of a dual phase co-continuous morphology can be determined by transmission electron microscopy (TEM). A composition has a dual phase co-continuous morphology if greater than or equal to 80% of the area of each phase is continuous as observed in a TEM image of the composition.

Figure 1:
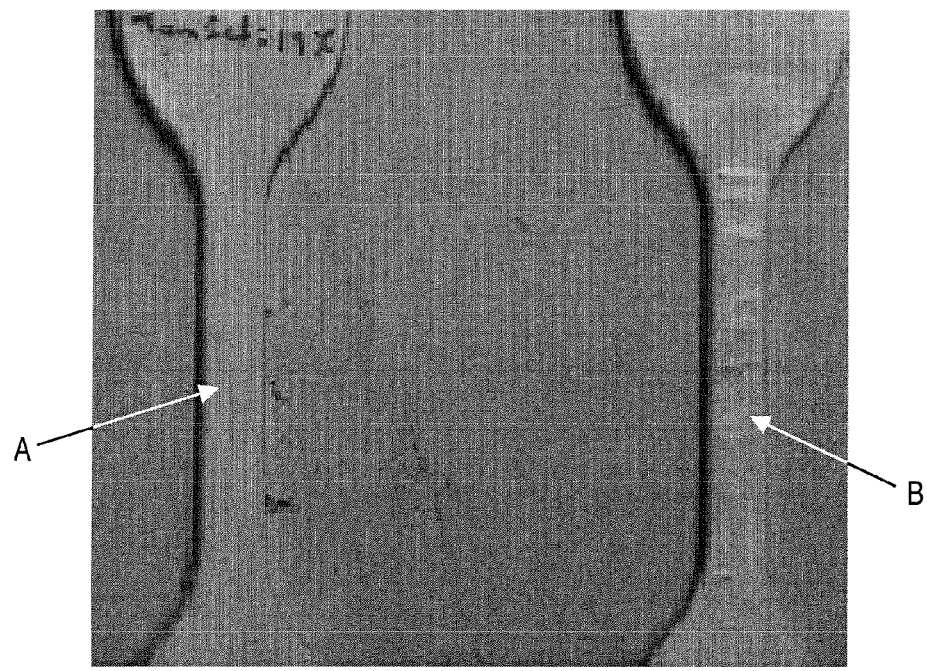
Figure 2:
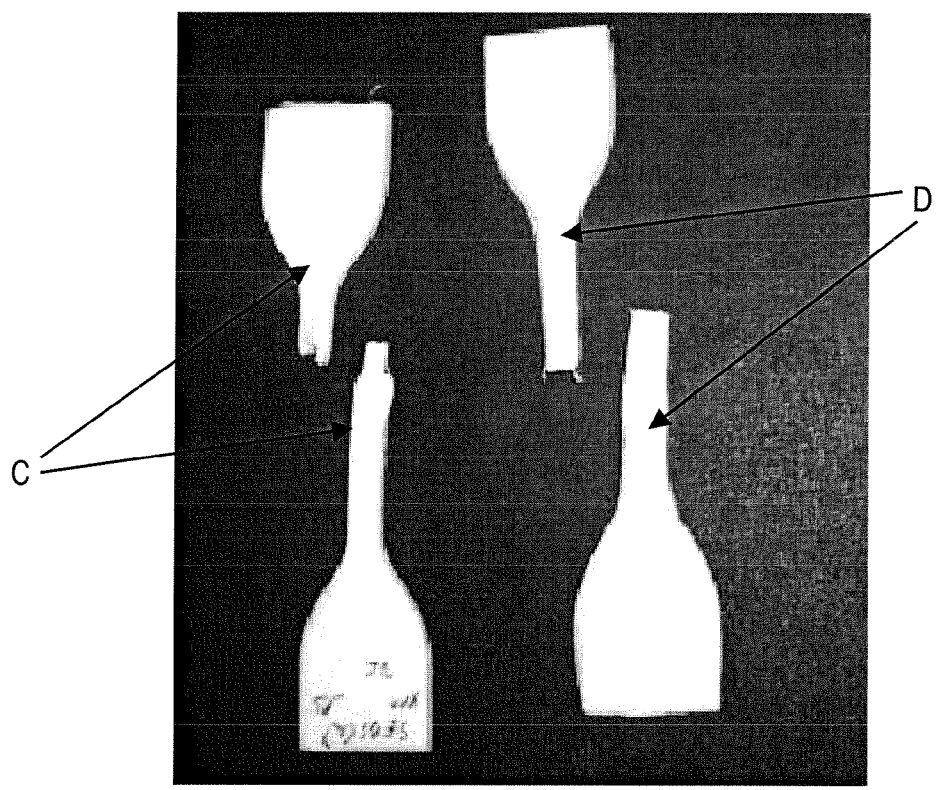

As used herein, "delamination" describes the separation of a surface layer, giving a flaking or onion skin effect. As used herein, "substantially free from delamination" is defined as showing no delamination as determined by unaided visual inspection of an intact injection molded specimen molded using the conditions described in the Examples. FIG. 1 shows a sample with substantially free from delamination (A) and a sample with delamination (B). "Unaided visual inspection" is performed by unaided visual observation in the absence of any magnifying device with the exception of corrective lenses necessary for normal eyesight. As used herein "essentially free of delamination" is defined as showing no delamination as determined by unaided visual inspection of the break surface created in a dumb bell specimen by tensile strength testing according to ASTM D 412-98a. The dumb bell specimen is injection molded using the conditions described in the Examples. FIG. 2 shows a sample that is essentially free of delamination (D) and a sample that shows delamination (C).

As mentioned above compositions having co-continuous hydrogenated block copolymer and poly(arylene ether) phases generally suffer from delamination. When ethylene-vinyl aliphatic acid copolymer is added to the composition, the ethylene-vinyl aliphatic acid copolymer is dispersed in the co-continuous phases and the composition does not suffer from delamination. Additionally compositions comprising poly(arylene ether), an optional homopolymer of an alkenyl aromatic polymer, a hydrogenated block copolymer and ethylene-vinyl aliphatic acid copolymer have greater ultimate elongation than comparable compositions without ethylene-vinyl aliphatic acid copolymer.

The composition, without filler, has an ultimate elongation of 150% to 350% as determined by ASTM D 412-98a using a strain rate of 200 millimeters per minute (mm/min). Within this range the composition has an ultimate elongation greater than or equal to 160%, or, more specifically, greater than or equal to 170%.

The composition, without filler, has a tensile modulus at 50% of the ultimate elongation of 12 Megapascals (MPa) to 25 MPa. Within this range the composition has a tensile modulus greater than or equal to 14 MPa, or, more specifically, greater than or equal to 16 Mpa. Tensile modulus at 50% of the ultimate elongation is determined by ASTM D 412-98a.

The composition can be recycled by reusing material which has already been formed into an article. To reuse the material the article is reduced to particles of a size suitable for reprocessing. Particle size is generally determined by the reprocessing method (e.g., injection molding, extrusion molding, and the like) and may be determined by one of ordinary skill in the art. Exemplary methods of reducing an article to particles include chopping, grinding, and combinations thereof. A "recycle" is defined as reducing an already formed article to particles and using the particles to make a new article. The composition, after 1 to 10 recycles, can have a tensile strength that is greater than or equal to 100% of the tensile strength of the virgin material. Tensile strength, as used herein, is determined by ASTM D 412-98a. More specifically, the recycled composition, after 1 to 10 recycles, has a tensile strength that is greater than or equal to 12 MPa, or, more specifically, greater than or equal to 13 MPa, or, even more specifically, greater than or equal to 14 MPa.

Additionally, the recycled composition, without filler and after 1 to 10 recycles, has an ultimate elongation that is greater than or equal to the ultimate elongation of the virgin material when determined as described above. More specifically, the recycled material, without filler and after 1 to 10 recycles, has an ultimate elongation of 150% to 350%. Within this range the ultimate elongation is greater than or equal to 160%, or, even more specifically, greater than or equal to 170%.

The recycled composition, without filler and after 1 to 10 recycles, has a tensile modulus at 50% elongation that is greater than or equal to the tensile modulus at 50% elongation of the virgin material when determined as described above. More specifically, the recycled composition, after 1 to 10 recycles, can have a tensile modulus at 50% of the ultimate elongation of 12 Megapascals (MPa) to 25 MPa. Within this range the recycled composition may have a tensile modulus greater than or equal to 14 MPa, or, more specifically, greater than or equal to 16 Mpa.

In some embodiments the injection molded test specimens made from the composition are resistant to degradation of (decrease in) tensile strength when subjected to elevated temperatures for extended periods of time. In one embodiment, when injection molded test specimens of the composition are heat aged at 80° C. for 500 hours the specimens have a tensile strength that is greater than or equal to 80%, or, more specifically, greater than or equal to 90%, or, even more specifically, greater than or equal to 95% of the tensile strength prior to heat aging. Tensile strength testing is performed as described above.

Poly(arylene ether) comprises repeating structural units of formula (I)

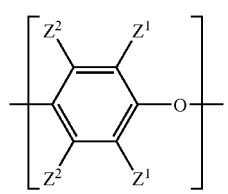

(I)

wherein for each structural unit, each $Z^1$ is independently halogen, unsubstituted or substituted $C_1$-$C_{12}$ hydrocarbyl with the proviso that that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl with the proviso that that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms.

As used herein, the term "hydrocarbyl", whether used by itself, or as a prefix, suffix, or fragment of another term, refers to a residue that contains only carbon and hydrogen. The residue may be aliphatic or aromatic, straight-chain, cyclic, bicyclic, branched, saturated, or unsaturated. It may also contain combinations of aliphatic, aromatic, straight chain, cyclic, bicyclic, branched, saturated, and unsaturated hydrocarbon moieties. However, when the hydrocarbyl residue is described as "substituted", may contain heteroatoms over and above the carbon and hydrogen members of the substituent residue. Thus, when specifically described as substituted, the hydrocarbyl residue may also contain halogen atoms, nitro groups, cyano groups, carbonyl groups, carboxylic acid groups, ester groups, amino groups, amide groups, sulfonyl groups, sulfoxyl groups, sulfonamide groups, sulfamoyl groups, hydroxyl groups, alkoxyl groups, or the like, and it may contain heteroatoms within the backbone of the hydrocarbyl residue.

The poly(arylene ether) may comprise molecules having aminoalkyl-containing end group(s), typically located in an ortho position to the hydroxy group. Also frequently present are tetramethyl diphenylquinone (TMDQ) end groups, typically obtained from reaction mixtures in which tetramethyl diphenylquinone by-product is present.

The poly(arylene ether) may be in the form of a homopolymer; a copolymer; a graft copolymer; an ionomer; or a block copolymer; as well as combinations comprising at least one of the foregoing. Poly(arylene ether) includes polyphenylene ether comprising 2,6-dimethyl-1,4-phenylene ether units optionally in combination with 2,3,6-trimethyl-1,4-phenylene ether units.

The poly(arylene ether) may be prepared by the oxidative coupling of monohydroxyaromatic compound(s) such as 2,6-xylenol and/or 2,3,6-trimethylphenol. Catalyst systems are generally employed for such coupling; they can contain heavy metal compound(s) such as a copper, manganese or cobalt compound, usually in combination with various other materials such as a secondary amine, tertiary amine, halide or combination of two or more of the foregoing.

The poly(arylene ether) can have a number average molecular weight of 3,000 to 40,000 grams per mole (g/mol) and a weight average molecular weight of 5,000 to 80,000 g/mol, as determined by gel permeation chromatography using monodisperse polystyrene standards, a styrene divinyl benzene gel at 40° C. and samples having a concentration of 1 milligram per milliliter of chloroform. The poly(arylene ether) or combination of poly(arylene ether)s can have an initial intrinsic viscosity of 0.25 to 0.6 deciliters per gram (dl/g), as measured in chloroform at 25° C. Initial intrinsic viscosity is defined as the intrinsic viscosity of the poly (arylene ether) prior to melt mixing with the other components of the composition and final intrinsic viscosity is defined as the intrinsic viscosity of the poly(arylene ether) after melt mixing with the other components of the composition. As understood by one of ordinary skill in the art the viscosity of the poly(arylene ether) may be up to 30% higher after melt mixing. The percentage of increase can be calculated by (final intrinsic viscosity—initial intrinsic viscosity)/ initial intrinsic viscosity. Determining an exact ratio, when two intrinsic viscosities are used, will depend somewhat on the exact intrinsic viscosities of the poly(arylene ether) used and the ultimate physical properties that are desired.

The composition comprises poly(arylene ether) in an amount of 25 to 40 weight percent (wt %), based on the combined weight of the poly(arylene ether), ethylene-vinyl aliphatic acid copolymer, block copolymer, and optional homopolymer of an alkenyl aromatic monomer. Within this range the amount of poly(arylene ether) may be less than or equal to 35 wt %.

The block copolymer is a copolymer comprising (A) at least one block comprising repeating aryl alkylene units and (B) at least one block comprising repeating alkylene units. The arrangement of blocks (A) and (B) may be a linear structure or a radial teleblock structure having branched chains. A-B diblock copolymers have one block A comprising repeating aryl alkylene units and A-B-A triblock copolymers have two blocks A comprising repeating aryl alkylene units. The pendant aryl moiety may be polycyclic and may have a substituent at any available position on the cyclic portion. Suitable substituents include alkyl groups having 1 to 4 carbons. An exemplary aryl alkylene unit is phenylethylene, which is shown in formula (II):

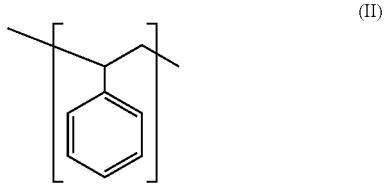

(II)

Block A may further comprise alkylene units having 2 to 15 carbons as long as the quantity of aryl alkylene units exceeds the quantity of alkylene units. Block B comprises repeating alkylene units having 2 to 15 carbons such as ethylene, propylene, butylene or combinations of two or more of the foregoing. Block B may further comprise aryl alkylene units as long as the quantity of alkylene units exceeds the quantity of aryl alkylene units. Each occurrence of block A may have a molecular weight which is the same or different than other occurrences of block A. Similarly each occurrence of block B may have a molecular weight which is the same or different than other occurrences of block B.

In one embodiment, the B block is a controlled distribution copolymer. As used herein "controlled distribution" is defined as referring to a molecular structure lacking well-defined blocks of either monomer, with "runs" of any given single monomer attaining a maximum number average of 20 units as shown by either the presence of only a single glass transition temperature (Tg), intermediate between the Tg of either homopolymer, or as shown via proton nuclear magnetic resonance methods. When the B block comprises a controlled distribution copolymer, each A block may have an average molecular weight of 3,000 to 60,000 g/mol and each B block may have an average molecular weight of 30,000 to 300,000 g/mol, as determined using light scattering techniques. When the B block is a controlled distribution polymer, each B block comprises at least one terminal region adjacent to an A block that is rich in alkylene units and a region not adjacent to the A block that is rich in aryl alkylene units. The total amount of aryl alkylene units is 15 to 75 weight percent, based on the total weight of the block copolymer. The weight ratio of alkylene units to aryl alkylene units in the B block may be 5:1 to 1:2. Exemplary block copolymers are further disclosed in U.S. Patent Application No. 2003/181584 and are commercially available from Kraton Polymers under the trademark KRATON. Exemplary grades are A-RP6936 and A-RP6935.

The repeating aryl alkylene units result from the polymerization of aryl alkylene monomers such as styrene. The repeating alkylene units result from the hydrogenation of repeating unsaturated units derived from dienes such as butadiene. The butadiene may comprise 1,4-butadiene and/or 1,2-butadiene. The B block may further comprise some unsaturated carbon-carbon bonds.

Exemplary block copolymers include polyphenylethylene-poly(ethylene/propylene) which is sometimes referred to as polystyrene-poly(ethylene/propylene), polyphenylethylene-poly(ethylene/propylene)-polyphenylethylene (sometimes referred to as polystyrene-poly(ethylene/propylene)-polystyrene) and polyphenylethylene-poly(ethylene/butylene)-polyphenylethylene (sometimes referred to as polystyrene-poly(ethylene/butylene)-polystyrene).

In some embodiments the block copolymer has an aryl alkylene content greater than or equal to 25 wt % based on the total weight of the block copolymer. In some embodiments the aryl alkylene content of the block copolymer is less than or equal to 50 wt %.

Exemplary block copolymers include those commercially available from Asahi under the trademark TUFTEC and have grade names such as H1043, as well as some grades available under the tradename SEPTON from Kuraray. Other exemplary block copolymers include those commercially available from Kraton Polymers under the trademark KRATON and have grade names such as G-1701, G-1702, G-1730, G-1641, G-1650, G-1651, G-1652, G-1657, A-RP6936 and A-RP6935.

In some embodiments the block copolymer comprises a diblock copolymer, a triblock copolymer, or a combination of diblock and triblock copolymers.

In some embodiments the block copolymer(s) has a weight average molecular weight of 75,000 to 120,000 grams per mole (g/mol), as determined by gel permeation chromatography (GPC) using polystyrene standards. Within this range, the weight average molecular weight can be greater than or equal to 76,000 g/mol, or, more specifically, greater than or equal to 77,000 g/mol. Also within this range, the number average molecular weight can be less than or equal to 115,000 g/mol, or, more specifically, less than or equal to 110,000 g/mol. When the block copolymer has a weight average molecular weight of 75,000 g/mol the composition can to 120,000 the composition can has a higher ultimate elongation than a comparable composition comprising a block copolymer having a weight average molecular weight greater than 120,000.

The composition comprises the block copolymer in an amount of 30 to 70 wt %, based on the combined weight of the poly(arylene ether), block copolymer, ethylene-vinyl aliphatic acid copolymer, and optional homopolymer of an alkenyl aromatic copolymer. Within this range the amount of block copolymer may be greater than or equal to 32 wt %, or, more specifically, greater than or equal to 35 wt %. Also within this range the amount of block copolymer may be less than or equal to 65 wt %.

Useful ethylene-vinyl aliphatic acid copolymer can be prepared by, for example, radical polymerization of ethylene and a vinyl ester of an aliphatic acid. Typical examples of vinyl esters of aliphatic acids are vinyl acetate, vinyl butyrate, vinyl laurate, etc. In one embodiment the ethylene-vinyl aliphatic acid copolymer is ethylene vinyl acetate copolymer (EVA). EVA is commercially available from Lanxess under the tradename LEVAPREN, from Arkema under the tradename EVATANE, from DuPont under the tradename ELVAX, and from Equistar under the tradename ULTRATHENE.

It is understood that when ethylene and a vinyl ester of an aliphatic acid react to form the copolymer the resulting copolymer comprises residues (or moieties) derived from the vinyl ester of an aliphatic acid. The amount of these residues is referred to as the vinyl aliphatic acid content. The ethylene-vinyl aliphatic acid copolymer has a vinyl aliphatic acid content of 15 to 80 wt %, based on the total weight of the EVA. Within this range the amount of vinyl aliphatic acid content in the EVA may be greater than or equal to 18 wt %. Also within this range the amount of vinyl aliphatic acid content in the EVA may be less than 70 wt %.

The composition comprises the ethylene-vinyl aliphatic acid copolymer in an amount of 5 to 40 wt %, based on the combined weight of the poly(arylene ether), block copolymer, ethylene-vinyl aliphatic acid copolymer, and optional homopolymer of an alkenyl aromatic copolymer. Within this range the amount of ethylene-vinyl aliphatic acid copolymer may be greater than or equal to 7 wt %, or, more specifically, greater than or equal to 10 wt %. Also within this range the amount of ethylene vinyl acetate copolymer may be less than or equal to 35 wt %.

The composition can optionally comprise a homopolymer of an alkenyl aromatic monomer, wherein the alkenyl aromatic monomer has the formula

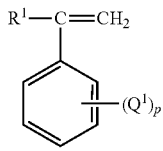

wherein $R^1$ is hydrogen, lower alkyl or halogen; $Q^1$ is vinyl, halogen or lower alkyl; and p is from 0 to 5. Exemplary alkenyl aromatic monomers include styrene, chlorostyrene, and vinyltoluene. In one embodiment the homopolymer of an alkenyl aromatic monomer is the homopolymer derived from styrene (i.e., homopolystyrene). The homopolystyrene comprises at least 99% of its weight, or, more specifically, 100% of its weight, from styrene. Homopolystyrenes include atactic and syndiotactic homopolystyrenes.

Homopolymers of an alkenyl aromatic monomer such as polystyrene are miscible with poly(arylene ether) in any amount. Homopolymers of an alkenyl aromatic monomer and poly(arylene ether), when melt blended, form a single phase.

When the composition comprises a homopolymer of an alkenyl aromatic monomer the combined amount of the homopolymer and poly(arylene ether) is 25 to 40 wt % based on the combined weight of poly(arylene ether), block copolymer, ethylene-vinyl aliphatic acid copolymer, and homopolymer of an alkenyl aromatic monomer. Within this range the combined amount may be less than or equal to 35 wt %. The weight ratio of poly(arylene ether) to homopolymer of alkenyl aromatic monomer may be 1:99 to 99:1. Within this range the weight ratio can be greater than or equal to 50:50, or, more specifically, greater than or equal to 60:40.

In some embodiments, the composition is substantially free of a rubber-modified poly(alkenyl aromatic) resin. The term "substantially free" is herein defined as constituting less than 0.5 weight percent, or, more specifically, less than 0.1 weight percent, or, even more specifically, 0 weight percent, of the total composition. A rubber-modified poly(alkenyl aromatic) resin consists of a polymer derived from at least one of the alkenyl aromatic monomers described above, and further consists of a rubber modifier in the form of a blend and/or a graft. The rubber modifier is a polymerization product of at least one $C_4$-$C_{10}$ nonaromatic diene monomer, such as butadiene or isoprene.

The composition may additionally comprise additives such as anti-oxidants, flame retardants, drip retardants, dyes, pigments, colorants, stabilizers, reinforcing filler, antistatic agents, nanofillers such as nanoclay, surface treated nanofillers, plasticizers, lubricants, cross linking agents such as silane cross linking agents, cross linking accelerators such as dibutyl tin oxide (DBTO, CAS No. 818-08-6), and mixtures thereof. The amounts of the additives are conventional and readily determinable by one of ordinary skill in the art.

In one embodiment a composition comprises:
25 to 40 weight percent of a combination of a poly(arylene ether) and a homopolymer of an alkenyl aromatic monomer;
30 to 70 weight percent of a block copolymer comprising a first block and a second block wherein the first block comprises repeating aryl alkylene units and the second block comprises repeating alkylene units; and
5 to 40 weight percent of an ethylene-vinyl aliphatic acid copolymer wherein weight percent is based on the combined weight of poly(arylene ether), homopolymer of an alkenyl aromatic monomer, block copolymer and ethylene-vinyl aliphatic acid copolymer. In one embodiment the foregoing composition is essentially free of delamination. In one embodiment the foregoing composition is substantially free of delamination.

In one embodiment a composition consists of:
25 to 40 weight percent of a combination of a poly(arylene ether) and a homopolymer of an alkenyl aromatic monomer;
30 to 70 weight percent of a block copolymer comprising a first block and a second block wherein the first block comprises repeating aryl alkylene units and the second block comprises repeating alkylene units;
5 to 40 weight percent of an ethylene-vinyl aliphatic acid copolymer; and
0 to 25 weight percent of one or more additives selected from the group consisting of anti-oxidants, flame retardants, drip retardants, dyes, pigments, colorants, stabilizers, reinforcing filler, antistatic agents, nanofillers, surface treated nanofillers, plasticizers, lubricants, cross linking agents, and cross linking accelerators wherein weight percent is based on the combined weight of poly(arylene ether), homopolymer of an alkenyl aromatic monomer, block copolymer and ethylene-vinyl aliphatic acid copolymer. In one embodiment the foregoing composition is essentially free of delamination. In one embodiment the foregoing composition is substantially free of delamination. In one embodiment the foregoing composition has an ultimate elongation greater than or equal to 150% as determined by ASTM D 412-98a using a strain rate of 200 millimeters per minute (mm/min).

The composition is formed by melt blending the components to form the composition. Suitable melt blending devices include single screw extruders, twin screw extruders. Some or all the components may be dry blended prior to melt blending. When a homopolymer of an alkenyl aromatic monomer is included in the composition the homopolymer can be melt blended with the poly(arylene ether) prior to melt blending with the remaining components.

In one embodiment a method for making the composition comprises melt blending
25 to 40 weight percent of a combination of a poly(arylene ether) and an optional homopolymer of an alkenyl aromatic monomer;
30 to 70 weight percent of a block copolymer comprising a first block and a second block wherein the first block comprises repeating aryl alkylene units and the second block comprises repeating alkylene units; and
5 to 40 weight percent of an ethylene-vinyl aliphatic acid copolymer wherein weight percent is based on the combined weight of poly(arylene ether), optional homopolymer of an alkenyl aromatic monomer, block copolymer and ethylene-vinyl aliphatic acid copolymer.

In one embodiment a method for making a composition comprises:

melt blending a poly(arylene ether) and a homopolymer of an alkenyl aromatic monomer to form a poly(arylene ether)/ alkenyl aromatic homopolymer blend; and melt blending 25 to 40 weight percent of the poly(arylene ether)/-alkenyl aromatic homopolymer blend with 30 to 70 weight percent of a block copolymer comprising a first block and a second block wherein the first block comprises repeating aryl alkylene units and the second block comprises repeating alkylene units and 5 to 40 weight percent of an ethylene-vinyl aliphatic acid copolymer wherein weight percent is based on the combined weight of poly(arylene ether), homopolymer of an alkenyl aromatic monomer, block copolymer and ethylene-vinyl aliphatic acid copolymer.

The composition can be formed into articles using a variety of methods including injection molding, extrusion molding, compression molding, blow molding, and the like. The composition can be used to make articles such as weather seals, fuel hoses, gaskets, sound dampers, vibration dampers, thermoplastic coating for electrical wires, and the like.

The composition and method of making the composition are further described by the following non-limiting examples.

EXAMPLES

The examples were prepared using the materials listed in Table 1. All amounts shown in the following tables are in weight percent based on the total weight of the composition unless otherwise specified. The poly(arylene ether) and polystyrene were mixed in a ratio of 60:40 by weight in a dry mixer and the mixed material was fed into a twin-screw extruder (ZSK 25), melt mixed at a temperature of 260-270° C., extruded as strands and cut into pellets. The pellets were dry mixed with the SEBS and EVA and fed into a 10 barrel twin screw extruder. The temperature was set zone wise as follows: 100° C. (Zone 1) to 270° C. (Zone 10) and the die had a temperature of 275° C. The extruder had a length to diameter ratio of 40. The screw speed was 300 rotations per minute (rpm) and the throughput rate was 15 kilograms per hour. The composition was extruded as strands and cut into pellets.

TABLE 1

| MATERIAL | DESCRIPTION |
|---|---|
| PPE 1 | A poly(2,6-dimethylphenylene ether) having an intrinsic viscosity of 0.33 dl/g as measured in chloroform at 25° C. and commercially available from GE Plastics. |
| PPE 2 | A poly(2,6-dimethylphenylene ether) having an intrinsic viscosity of 0.41 dl/g as measured in chloroform at 25° C. and commercially available from GE Plastics. |
| PPE 3 | A poly(2,6-dimethylphenylene ether) having an intrinsic viscosity of 0.46 dl/g as measured in chloroform at 25° C. and commercially available from GE Plastics. |
| PS | A polystyrene commercially available from Supreme Petrochem Ltd., India, under the tradename SC203EL. |
| SEBS 1 | A polyphenylethylene-poly(ethylene/butylene)-polyphenylethylene block copolymer having a weight average molecular weight of 101,000–102,000 and commercially available from Kraton Polymers under the tradename KRATON G 1650 |
| SEBS 2 | A polyphenylethylene-poly(ethylene/butylene)-polyphenylethylene block copolymer having a weight average molecular weight of 78,000–79,000 and commercially available from Kraton Polymers under the tradename KRATON G 1652 |
| EVA 1 | An ethylene vinyl acetate copolymer having a vinyl acetate content of 50 weight percent based on the total weight of the copolymer and commercially available from Lanxess under the tradename LEVAPREN 500. |
| EVA 2 | An ethylene vinyl acetate copolymer having a vinyl acetate content of 60 weight percent based on the total weight of the copolymer and commercially available from Lanxess under the tradename LEVAPREN 600. |

After the compositions were made the pellets were dried at 70° C. for 4 hours. They were injection molded using a De-Tech100 LNC4-E (L&T-100T, Germany) injection molding machine. The injection molding machine had a screw with a length to diameter ratio of 20 and a screw diameter of 32 millimeters. The temperature zones were: 270° C. (nozzle), 275° C. (mixing head 3), 260° C. (mixing head 2), 240° C.(mixing head 1); 60° C. (Feed); and 60° C. (Mold). The injection pressure was 5 MPa and the injection speed was 18 millimeters/second. Back pressure was 0.7 MPa and total cycle time was kept at 32 seconds. The dumb bell shaped samples were sized in accordance with ASTM D412-98a.

Samples were conditioned for 48 hours at 50% humidity and 23° C. prior to testing. Samples were tested for tensile strength (reported in MPa), ultimate elongation (reported in %), tensile modulus at 50% of ultimate elongation (reported in MPa), and tensile modulus at 100% of ultimate elongation (reported in MPa). Testing for ultimate elongation was performed using a strain rate of 200 mm/min. All tests were conducted at 23° C.

Figure 3:
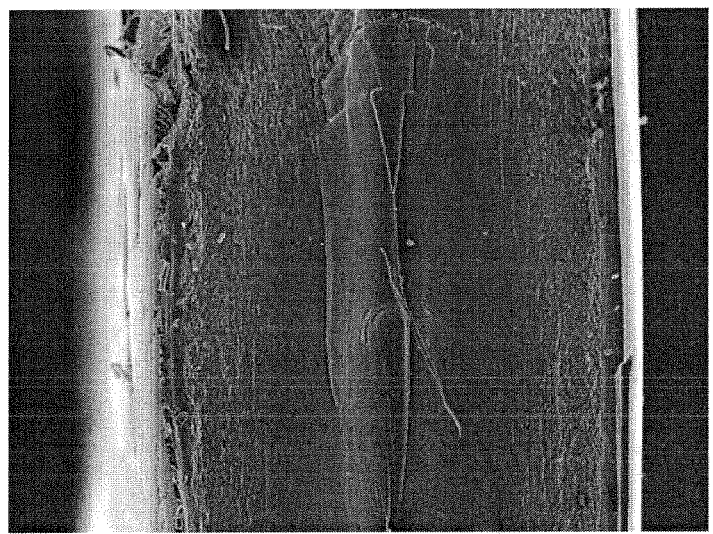
FIGS. 3 and 4 are scanning electron micrographs of the surfaces created by tensile strength testing, according to ASTM D 412-98a, of injection molded specimens.
Figure 4:
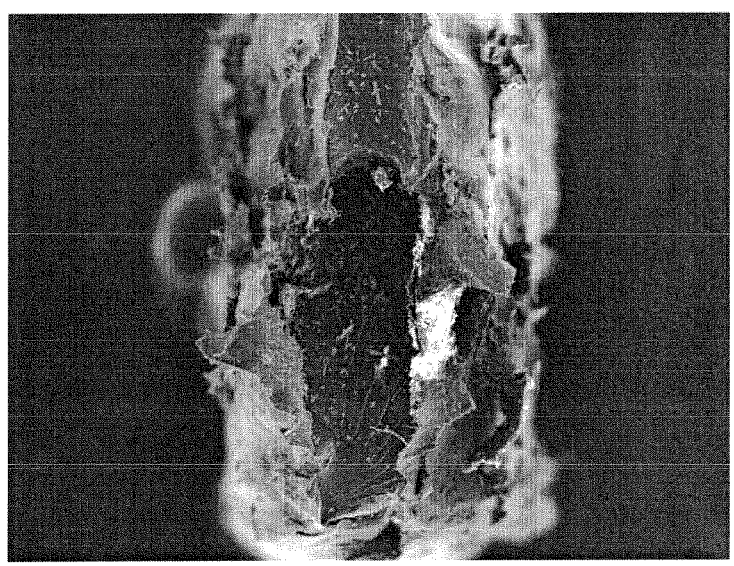

Delamination was determined by visual inspection of a dumb bell specimen after molding and after break caused by tensile strength testing. Determination of delamination was further supported by optical and scanning electron microscopy analysis. FIG. 1 is a picture showing two dumb bell specimens, A and B. Specimen A was made using the composition of Example 5 and shows no delamination by visual inspection. Specimen B was made using the composition of Example 1. Specimen B shows delamination, as evidenced by the ripples evident in the neck portion of the specimen. FIG. 2 shows two specimens, C and D, after testing for tensile strength. Specimen C, made using the composition of Example 1, shows an uneven break with delamination. Specimen D, made using the composition of Example 5, shows an even break with no delamination. FIG. 3 is a scanning electron micrograph of the surface created by the specimen break during tensile strength testing of Specimen D and shows no delamination. FIG. 4 is a scanning electron micrograph of the surface created by the specimen break during tensile strength testing of Specimen C and shows delamination.

Examples 1-8

Examples 1 through 3 have the compositions shown in Table 2. Data is also shown in Table. 2.

TABLE 2

|  | 1* | 2* | 3 | 4 | 5 | 6 | 7 | 8 |
|---|---|---|---|---|---|---|---|---|
| PPE 1/PS | — | — | 30 | — | — | — | — | 25 |
| PPE 2/PS | 30 | 30 | — | — | 25 | 25 | 30 | — |
| PPE 3/PS | — | — | — | 25 | — | — | — | — |
| EVA 1 | — | — | 10 | 15 | 30 | 15 | — | — |

TABLE 2-continued

|  | 1* | 2* | 3 | 4 | 5 | 6 | 7 | 8 |
|---|---|---|---|---|---|---|---|---|
| EVA 2 | — | — | — | — | — | — | 10 | 15 |
| SEBS 1 | 70 | — | — | — | — | 60 | — | 60 |
| SEBS 2 | — | 70 | 60 | 60 | 45 | — | 60 | — |
| Tensile strength [MPa] | 17.8 | 20.7 | 23.8 | 21 | 19.6 | 18.3 | 20.3 | 13 |
| Ultimate elongation [%] | 86.8 | 106 | 184 | 184 | 191 | 230 | 182 | 193 |
| Tensile modulus at 50% of ultimate elongation [MPa] | 15 | 17.1 | 15.2 | 12.0 | 11.0 | 10.9 | 12.4 | 8.0 |
| Tensile modulus at 100% of ultimate elongation [MPa] | — | 20.3 | 19.0 | 16.0 | 15.2 | 13.0 | 16.6 | 10.1 |
| Tensile set [%] | 9 | 5 | 20 | 8 | 15 | 18 | 14 | 14 |
| Delamination | Yes | Yes | No | No | No | No | No | No |

*Comparative Example

As can be seen by the data in Table 2, Examples 1 and 2 demonstrate that delamination occurs in the absence of EVA. Notably, Examples 1 and 2 both show an ultimate elongation less than 110% whereas the remaining Examples all have ultimate elongation values greater than 150%. Quite unexpectedly, compositions containing EVA do not demonstrate delamination and further show an improvement (increase) in ultimate elongation while maintaining comparable tensile strength. Additionally, the tensile set is less than or equal to 20% indicating good recovery after deformation.

The compositions of Examples 7 and 8 were further tested for recyclability. The compositions injection molded to form samples and tested (cycle 1) and the samples were then manually cut to particles having a size of 3 to 4 millimeters and the cut material was injection molded to form a second sample (cycle 2). This cutting and subsequent injection molding was repeated for cycles 3 and 4 in the case of Example 8. Data is shown in Table 3.

TABLE 3

|  | Tensile Strength MPa | Ultimate elongation [%] | Tensile modulus at 50% of ultimate elongation [MPa] | Tensile modulus at 100% of ultimate elongation [MPa] |
|---|---|---|---|---|
| 7 (1st Cycle) | 20.3 | 182 | 12.4 | 16.6 |
| 7 (2nd Cycle) | 21.1 | 185 | 12.8 | 16.7 |
| 8 (1st Cycle) | 13.0 | 193 | 8.0 | 10.1 |
| 8 (2nd Cycle) | 12.3 | 161 | 8.6 | 10.6 |
| 8 (3rd Cycle) | 15.4 | 175 | 10.4 | 13.0 |
| 8 (4th Cycle) | 22.3 | 262 | 11.6 | 14.0 |

The recyclability data shows that the composition properties stay consistent or improve after recycling. Of particular note is the increase in ultimate elongation over four cycles for Example 8. There is no unaided visual evidence of delamination after recycling.

Figure 6:
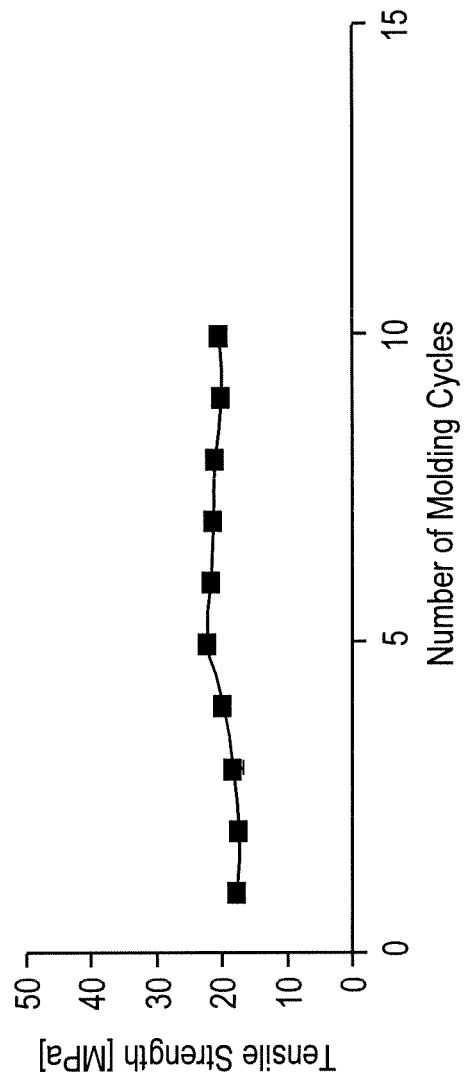
FIG. 6 is a graph showing the relationship between tensile strength and recycle.

The composition of Example 5 was recycled as described above with regard to Examples 7 and 8. The tensile strength of the recycled material in relation to the number of recycles is shown in FIG. 6. The composition shows no loss of tensile strength after 10 recycles.

Figure 7:
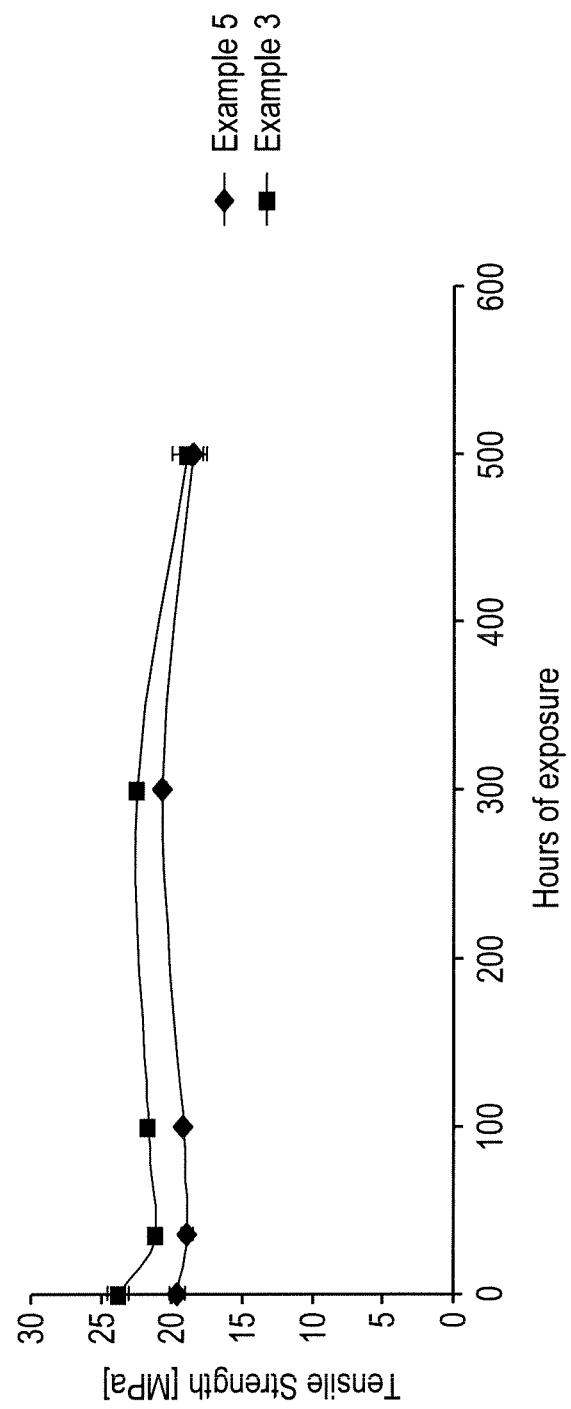
FIG. 7 is a graph showing the relationship between heat aging and tensile strength.

Injection molded test specimens of the compositions of Examples 3 and 5 were heat aged at 80° C. for 500 hours. Results are shown in FIG. 7. As can be seen from the graph, the compositions maintained greater than or equal to 80% of the original tensile strength after heat aging for 500 hours at 80° C. Can we allege unexpected retention?

Figure 5:
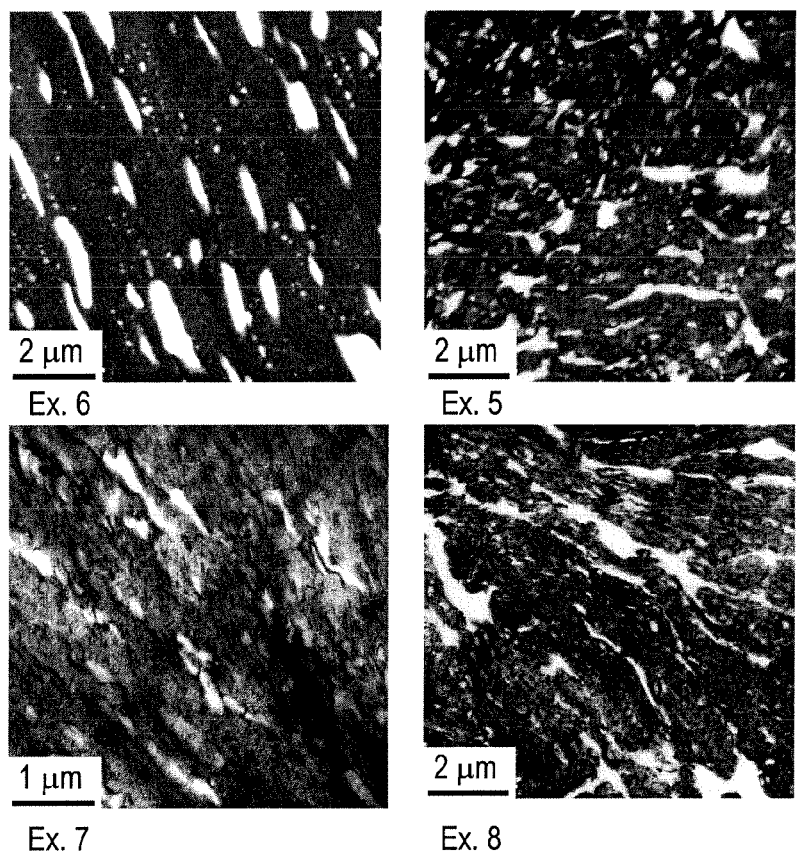
FIG. 5 is a group of transmission electron micrographs of Examples 5 through 8.

FIG. 5 comprises TEM images of Examples 5-8. The were obtained with a FEI Tecnai G2 transmission electron microscope operated at 120 kilovolts (kV). TEM specimen blocks were prepared from the parent sample in such a way as to section TEM specimen in the flow direction. 100 nanometer thick sections required for TEM studies were microtomed at −140° C. using a Leica FCS ultramicrcotome with a diamond knife procured from Microstar Technologies Inc. These sections were then vapor stained with $RuO_4$ (Ruthenium Tetraoxide) so as to differentiate different components in the formulation. Digital images were acquired with a Gatan 971 camera coupled with acquisition and image processing software from Digital Micrograph. The white areas shown in the images are EVA. The gray and darker gray areas are PPE and SEBS. As can be seen from the images, the PPE and the SEBS form a dual phase co-continuous morphology and the EVA is dispersed in the dual phase co-continuous matrix.

While the invention has been described with reference to a several embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

All cited patents, patent applications, and other references are incorporated herein by reference in their entirety.

The invention claimed is:

1. A composition comprising:
   a poly(arylene ether);
   a block copolymer comprising a first block and a second block wherein the first block comprises repeating aryl alkylene units and the second block comprises repeating alkylene units; and
   an ethylene-vinyl aliphatic acid copolymer having a vinyl aliphatic acid content of 50 to 80 weight percent based on the total weight of the ethylene-vinyl aliphatic acid copolymer, wherein the poly(arylene ether) and the block copolymer form a dual phase co-continuous morphology and the ethylene-vinyl aliphatic acid copolymer is dispersed in the co-continuous phases.

2. The composition of claim 1 wherein the composition is essentially free from delamination upon visual inspection.

3. The composition of claim 1, wherein the composition is substantially free from delamination upon visual inspection.

4. The composition of claim 1 further comprising a homopolymer of an alkenyl aromatic monomer.

5. The composition of claim 4, wherein the combined amount of poly(arylene ether) and homopolymer of an alkenyl aromatic monomer is 25 to 40 weight percent based on the combined weight of the poly(arylene ether), block copolymer, ethylene-vinyl aliphatic acid copolymer and homopolymer of alkenyl aromatic copolymer.

6. The composition of claim 4 wherein the weight ratio of poly(arylene ether) to homopolymer is 1:99 to 99:1.

7. The composition of claim 6 wherein the weight ratio of poly(arylene ether) to homopolymer is greater than or equal to 60:40.

8. The composition of claim 1 wherein the composition has an ultimate elongation of 150% to 350% as determined by ASTM D 412-98A using a strain rate of 200 millimeters per minute.

9. The composition of claim 1 wherein the composition has a tensile modulus at 50% of the ultimate elongation of 12 Megapascals to 25 Megapascals as determined by ASTM D 412-98A.

10. The composition of claim 1 wherein after 10 recycles the composition retains greater than or equal to 100% of the tensile strength of the virgin composition.

11. The composition of claim 1 wherein the composition, when injection molded into test specimens, retains greater than or equal to 80% of the tensile modulus after heat aging at 80° C. for 500 hours.

12. The composition of claim 1 wherein the composition comprises 25 to 40 weight percent of poly(arylene ether) based on the combined weight of poly(arylene ether), block copolymer and ethylene-vinyl aliphatic acid copolymer.

13. The composition of claim 1 wherein the block copolymer has an aryl alkylene content greater than or equal to 25 weight percent based on the total weight of the block copolymer.

14. The composition of claim 1 wherein the block copolymer has a weight average molecular weight 75,000 to 120,000 gram per mole as determined by gel permeation chromatography using polystyrene standards.

15. The composition of claim 1 wherein the block copolymer is present in an amount of 30 to 70 weight percent based on the combined weight of poly(arylene ether), block copolymer and ethylene-vinyl aliphatic acid copolymer.

16. The composition of claim 1 wherein the ethylene-vinyl aliphatic acid copolymer is present in an amount of 5 to 40 weight percent based on the combined weight of poly(arylene ether), block copolymer and ethylene-vinyl aliphatic acid copolymer.

17. The composition of claim 1 wherein the composition is substantially free of a rubber modified poly(alkenyl aromatic) resin.

18. The composition of claim 1 further comprising an anti-oxidant, flame retardant, drip retardant, dye, pigment, colorant, stabilizer, reinforcing filler, antistatic agent, nanofiller, surface treated nanofiller, plasticizer, lubricant, cross linking agent, cross linking accelerator, or a mixture comprising two or more of the foregoing.

19. The composition of claim 1 wherein the ethylene-vinyl aliphatic acid copolymer is an ethylene-vinyl acetate copolymer.

20. A composition consisting of:
  25 to 40 weight percent of a combination of a poly(arylene ether) and a homopolymer of an alkenyl aromatic monomer;
  30 to 70 weight percent of a block copolymer comprising a first block and a second block wherein the first block comprises repeating aryl alkylene units and the second block comprises repeating alkylene units;
  5 to 40 weight percent of an ethylene-vinyl aliphatic acid copolymer having a vinyl aliphatic acid content of 50 to 80 weight percent based on the total weight of the ethylene-vinyl aliphatic acid copolymer; and
  0 to 25 weight percent of one or more additives selected from the group consisting of anti-oxidants, flame retardants, drip retardants, dyes, pigments, colorants, stabilizers, reinforcing filler, antistatic agents, nanofillers, surface treated nanofillers, plasticizers, lubricants, cross linking agents, and cross linking accelerators,
  wherein weight percent is based on the combined weight of poly(arylene ether), homopolymer of an alkenyl aromatic monomer, block copolymer and ethylene-vinyl aliphatic acid copolymer.

21. The composition of claim 20, wherein the composition is essentially free of delamination.

22. The composition of claim 20, wherein the composition is substantially free of delamination.

23. The composition of claim 20, wherein the composition has an ultimate elongation greater than or equal to 150% as determined by ASTM D 412-98a using a strain rate of 200 millimeters per minute (mm/min).

24. A composition comprising:
  25 to 40 weight percent of a combination of a poly(arylene ether) and a homopolymer of an alkenyl aromatic monomer;
  30 to 70 weight percent of a block copolymer comprising a first block and a second block wherein the first block comprises repeating aryl alkylene units and the second block comprises repeating alkylene units; and
  5 to 40 weight percent of an ethylene-vinyl aliphatic acid copolymer having a vinyl aliphatic acid content of 50 to 80 weight percent based on the total weight of the ethylene-vinyl aliphatic acid copolymer,
  wherein weight percent is based on the combined weight of poly(arylene ether), homopolymer of an alkenyl aromatic monomer, block copolymer and ethylene-vinyl aliphatic acid copolymer, wherein the composition has an ultimate elongation greater than or equal to 150% as determined by ASTM D412-98a using a strain rate of 200 millimeters per minute.

25. The composition of claim 24, wherein the composition is essentially free of delamination.

26. The composition of claim 24, wherein the composition is substantially free of delamination.

27. The composition of claim 24 wherein the weight ratio of poly(arylene ether) to homopolymer is 1:99 to 99:1.

28. The composition of claim 27 wherein the weight ratio of poly(arylene ether) to homopolymer is greater than or equal to 60:40.

29. The composition of claim 24 wherein the composition has a tensile modulus at 50% of the ultimate elongation of 12 Megapascals to 25 Megapascals as determined by ASTM D 412-98A.

30. The composition of claim 24 wherein after 1 to 10 recycles the composition has a tensile strength that is greater than or equal to 100% of the tensile strength of the virgin composition as determined by ASTM D 412-98A.

31. The composition of claim 24 wherein the composition, when injection molded into test specimens, retains greater than or equal to 80% of the tensile modulus after heat aging at 80° C. for 500 hours.

32. The composition of claim 24 wherein the block copolymer has a weight average molecular weight 75,000 to 120,000 gram per mole as determined by gel permeation chromatography using polystyrene standards.

33. The composition of claim 24 wherein the block copolymer has an aryl alkylene content greater than or equal to 25 weight percent based on the total weight of the block copolymer.

34. The composition of claim 24 wherein the composition is substantially free of a rubber modified poly(alkenyl aromatic) resin.

35. The composition of claim 24 further comprising an anti-oxidant, flame retardant, drip retardant, dye, pigment, colorant, stabilizer, reinforcing filler, antistatic agent, nanofiller, surface treated nanofiller, plasticizer, lubricant, cross linking agent, cross linking accelerator, or a mixture comprising two or more of the foregoing.

36. The composition of claim 24 wherein the ethylene-vinyl aliphatic acid copolymer is an ethylene-vinyl acetate copolymer.

37. A method of making a composition comprising melt blending
- 25 to 40 weight percent of a combination of a poly(arylene ether) and an optional homopolymer of an alkenyl aromatic monomer;
- 30 to 70 weight percent of a block copolymer comprising a first block and a second block wherein the first block comprises repeating aryl alkylene units and the second block comprises repeating alkylene units; and
- 5 to 40 weight percent of an ethylene-vinyl aliphatic acid copolymer having a vinyl aliphatic acid content of 50 to 80 weight percent based on the total weight of the ethylene-vinyl aliphatic acid copolymer,
- wherein weight percent is based on the combined weight of poly(arylene ether), homopolymer of an alkenyl aromatic monomer, block copolymer and ethylene-vinyl aliphatic acid copolymer.

38. A method of making a composition comprising:
- melt blending a poly(arylene ether) and a homopolymer of an alkenyl aromatic monomer to form a poly(arylene ether)/ alkenyl aromatic homopolymer blend; and
- melt blending 25 to 40 weight percent of the poly(arylene ether)/ alkenyl aromatic homopolymer blend with 30 to 70 weight percent of a block copolymer comprising a first block and a second block wherein the first block comprises repeating aryl alkylene units and the second block comprises repeating alkylene units and 5 to 40 weight percent of an ethylene-vinyl aliphatic acid copolymer having a vinyl aliphatic acid content of 50 to 80 weight percent based on the total weight of the ethylene-vinyl aliphatic acid copolymer,
- wherein weight percent is based on the combined weight of poly(arylene ether), homopolymer of an alkenyl aromatic monomer, block copolymer and ethylene-vinyl aliphatic acid copolymer.

39. An article comprising a thermoplastic composition wherein the thermoplastic composition comprises:
- 25 to 40 weight percent of a combination of a poly(arylene ether) and a homopolymer of an alkenyl aromatic monomer;
- 30 to 70 weight percent of a block copolymer comprising a first block and a second block wherein the first block comprises repeating aryl alkylene units and the second block comprises repeating alkylene units; and
- 5 to 40 weight percent of an ethylene-vinyl aliphatic acid copolymer having a vinyl aliphatic acid content of 50 to 80 weight percent based on the total weight of the ethylene-vinyl aliphatic acid copolymer,
- wherein weight percent is based on the combined weight of poly(arylene ether), homopolymer of an alkenyl aromatic monomer, block copolymer and ethylene-vinyl aliphatic acid copolymer, and wherein the composition has an ultimate elongation greater than or equal to 150% as determined by ASTM D412-98a using a strain rate of 200 millimeters per minute.

40. The article of claim 39 wherein the article is a weather seal, fuel hose, gasket, sound damper, vibration damper, or thermoplastic coating for electrical wire.

\* \* \* \* \*